United States Patent
Nguyen et al.

(10) Patent No.: US 10,858,604 B2
(45) Date of Patent: Dec. 8, 2020

(54) PHENOL ALDEHYDES ASPHALTENE INHIBITORS

(71) Applicants: Henry Nguyen, Houston, TX (US); Jerry Weers, Richmond, TX (US); David Jennings, Houston, TX (US); Kung-Po Chao, Stafford, TX (US); Joey Dacula Mangadlao, Agusan del Sur (PH)

(72) Inventors: Henry Nguyen, Houston, TX (US); Jerry Weers, Richmond, TX (US); David Jennings, Houston, TX (US); Kung-Po Chao, Stafford, TX (US); Joey Dacula Mangadlao, Agusan del Sur (PH)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 65 days.

(21) Appl. No.: 16/210,090

(22) Filed: Dec. 5, 2018

(65) Prior Publication Data
US 2019/0177630 A1  Jun. 13, 2019

Related U.S. Application Data

(60) Provisional application No. 62/596,303, filed on Dec. 8, 2017.

(51) Int. Cl.
*C10L 1/198* (2006.01)
*C10L 1/222* (2006.01)
(Continued)

(52) U.S. Cl.
CPC .............. *C10L 1/1981* (2013.01); *C08G 8/12* (2013.01); *C10L 1/143* (2013.01); *C10L 10/04* (2013.01);
(Continued)

(58) Field of Classification Search
CPC combination set(s) only.
See application file for complete search history.

(56) References Cited

U.S. PATENT DOCUMENTS 5,143,594 A   9/1992  Stephenson et al.
5,998,530 A   12/1999 Krull et al.
(Continued)

OTHER PUBLICATIONS

Adams, Jeramie J.; "Asphaltene Adsorption, A Literature Review"; Energy & Fuels; 2014; American Chemical Society Publication; 26 pages.
(Continued)

*Primary Examiner* — Ellen M McAvoy
*Assistant Examiner* — Chantel L Graham
(74) *Attorney, Agent, or Firm* — Cantor Colburn LLP

(57) ABSTRACT

A method of stabilizing asphaltenes in a petroleum hydrocarbon fluid comprises contacting the petroleum hydrocarbon fluid with a mixed phenol aldehyde derived from an aldehyde and two or more unsubstituted or alkyl-substituted monophenols, the two or more unsubstituted or alkyl-substituted monophenols comprising a first phenol which is a $C_{1-20}$ linear or branched alkyl monophenol; and a second phenol which is unsubstituted or a $C_{1-20}$ linear or branched alkyl monophenol different from the first phenol, wherein the molar ratio of the first phenol relative to the second phenol is about 4:1 to about 1:4.

14 Claims, 3 Drawing Sheets

(51) Int. Cl.
| | |
|---|---|
| C10L 1/232 | (2006.01) |
| C08G 8/12 | (2006.01) |
| C10L 10/04 | (2006.01) |
| C10L 1/14 | (2006.01) |

(52) U.S. Cl.
CPC ............ *C10L 1/2222* (2013.01); *C10L 1/232* (2013.01); *C10L 2200/0254* (2013.01); *C10L 2200/0259* (2013.01); *C10L 2200/0453* (2013.01); *C10L 2230/08* (2013.01); *C10L 2230/14* (2013.01)

(56) References Cited

U.S. PATENT DOCUMENTS

| | | | |
|---|---|---|---|
| 6,180,683 | B1* | 1/2001 | Miller ................ B01F 17/0092 516/31 |
| 6,313,367 | B1 | 11/2001 | Breen |
| 8,075,763 | B2 | 12/2011 | Sneddon et al. |
| 8,123,930 | B2 | 2/2012 | Cohrs et al. |
| 9,360,425 | B2 | 6/2016 | Jennings et al. |
| 9,453,830 | B2 | 9/2016 | Zhang et al. |
| 9,464,239 | B2 | 10/2016 | Nares Ochoa et al. |
| 9,637,676 | B2 | 5/2017 | Leonard et al. |
| 9,663,726 | B2 | 5/2017 | Yang et al. |
| 2007/0221539 | A1 | 9/2007 | Cohrs et al. |
| 2009/0090655 | A1 | 4/2009 | Stark et al. |
| 2017/0096606 | A1* | 4/2017 | Pinappu ................ C10L 1/2493 |
| 2019/0048712 | A1* | 2/2019 | Jennings ................ G01N 9/002 |

OTHER PUBLICATIONS

Amarasekara, Ananda S.; "Acidic ionic Liquids"; Chemical Reviews; 2016; American Chemical Society Publications; 51 pages.
Anderson, et al.; "Naphthenic Acis Extraction and Speciation from Doba Crude Oil Using Carbonate-Based Ionic Liquids"; 2015 Elseview Ltd.; 9 pages.
Biniaz, et al.; "Demulsification of Water Oil Emulsion Using Ionic Liquids: Statistical Modeling and Optimization"; 2016 Elsevier LTD.; 9 pages.
Boukherissa, et al.; "Ionic Liquids as Dispersants of Petroleum Asphaltenes"; Energy & Fuels; 2009; vol. 23, American Chemical Society; pp. 2557-2564.
Buckley, Jill S.; "Asphaltene Deposition"; Energy & Fuels; 2012; American Chemical Sociery Publications; 5 pages.
Derakhshesh, et al.; "Effect of Ashaltene Stability on Fouling at Delayed Coking Process Furnace Conditions"; Energy & Fuels; 2013; American Chemical Society Publications; 9 pages.
Guzman, et al.; "Methods for Determining Asphaltene Stability in Crude Oils"; 2016; Elsevier; 14 pages.
Hallett, et al.;"Room-Temperature Ionic Liquids: Solvents for Synthesis and Catalysis. 2"; Chemical Reviews; 2011; American Chemical Society Publications; 69 pages.
Hu, et al; "Effect of the Structures of Ionic Liquids and Alkylbenzene-Derived Amphiphiles on the Inhibition of Asphaltene Presecription from CO2-Injected Reservoir Oils"; 2005 American Chemical Society; 7 pages.
International Search Report for International Application No. PCT/US2018/064647, International Filing Date Dec. 10, 2018, dated May 21, 2019, 5 pages
Jennings et al."Method for Field Monitoring Asphaltene Treatment Programs", OTC27129, paper presented at the Offshore Technology Conference held in Houston, Texas, USA, May 2-5, 2016; 13 pages.
Jennings, et al. "MS New Dead-Crude Oil Asphaltene Inhibitor Test Method", Offshore Technology Conference held in Houston, Texas, May 5-8, 2014; 14 pages.
Lima, et al.; "Polycardanol or Sulfonated Polystyrene as Flocculants for Asphaltene Dispersions"; Energy & Fuels; 2010; American Chemical Society; 7 pages.
Nezhad, et al.; "Dispersing of Petroleum Asphaltenes by Acidic Ionic Liquid and Determination by UV-Visible Spectroscopy"; vol. 2013; Journal of Petroleum Engineering; Hindawi Publishing Corporation; 6 pages.
Pereira, et al.; "Resins: The Molecules Responsible for the Stability/Instability Phenomena of Asphaltenes"; Energy & Fuels; vol. 21; 2007 American Chemical Society; 5 pages.
Sakthivel, et al.; "Experimental Investigation on the Effect of Aliphatic Ionic Liquids on the Solubility of Heavy Crude Oil Using UV-Visible, Fourier Transform-Infrared, and 13C NMR Spectroscopy"; Energy & Fuels; 2014 American Chemical Society Publications; 12 pages.
Shaban, et al.; "Upgrading and Viscosity Reduction of Heavy Oil by Catalytic Ionic Liquid"; Energy & Fuels; 2014; American Chemical Society Publications; 9 pages.
Subramanian, et al.; "Ionic Liquids as Viscosity Modifiers for Heavy and Extra-Heavy Crude Oils"; 2014 Elsevier Ltd; 8 pages.
Written Opinion for International Application No. PCT/US2018/064647, International Filing Date Dec. 10, 2018, dated May 21, 2019, 3 pages.
Yakubov, et al.; "Inhibition of Asphaltene Prescription by Resins with Various Contents of Vanadyl Porphyrins"; Energy & Fuels; 2016 American Chemical Society Publications ; 6 pages.

* cited by examiner

PHENOL ALDEHYDES ASPHALTENE INHIBITORS

CROSS REFERENCE TO RELATED APPLICATIONS

This application claims the benefit of an earlier filing date from U.S. Provisional Application Ser. No. 62/596,303, filed Dec. 8, 2017, the entire disclosure of which is incorporated herein by reference.

BACKGROUND

Asphaltenes are heterocyclic macromolecules present in petroleum that cause adverse effects in both the production and refining of petroleum. In petroleum production operations, asphaltenes have deposited or accumulated in various locations in production facilities ranging from the formation to well tubulars to flowlines to processing equipment causing a reduction or complete stoppage of production. Asphaltenes have also caused failure of critical safety valves and fluid processing problems. Asphaltene problems occur in both onshore and offshore in petroleum production operations globally. In petroleum refining, asphaltenes have been responsible for catalyst poisoning, coke formation, and fouling in heat exchangers. Thus materials and methods for inhibiting by either preventing or reducing asphaltene deposition and/or accumulation would be well received in the art. One method to reduce asphaltene deposition and asphaltene related fluid processing problems is to apply asphaltene inhibitor chemistries to the petroleum fluids.

BRIEF DESCRIPTION

A method of stabilizing asphaltenes in a petroleum hydrocarbon fluid comprises contacting the petroleum hydrocarbon fluid with a mixed phenol aldehyde derived from an aldehyde and two or more unsubstituted or alkyl-substituted monophenols, the two or more unsubstituted or alkyl-substituted monophenols comprising a first phenol which is a $C_{1-20}$ linear or branched alkyl monophenol; and a second phenol which is unsubstituted or a $C_{1-20}$ linear or branched alkyl monophenol different from the first phenol, wherein the molar ratio of the first phenol relative to the second phenol is about 4:1 to about 1:4.

Also disclosed is a petroleum hydrocarbon fluid containing the mixed phenol aldehyde as described above.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
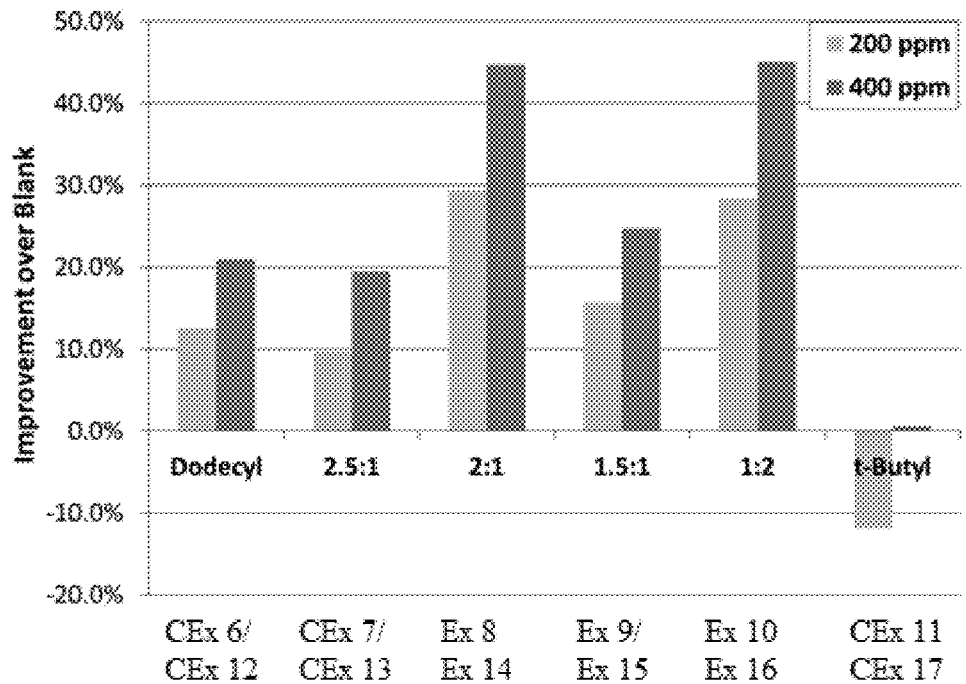
FIG. 1 shows the Analytical Centrifuge Stability Analysis for Asphaltenes (ACSAA) test results at 25° C. on Crude Oil #1 treated with phenol aldehydes derived from 100% dodecyl phenol, or 100% of t-butyl phenol, or a combination of dodecyl/t-butyl phenol having different molar ratios.

Phenol aldehydes are often used as asphaltene stabilizers. However, in practice, challenges exist in making phenol aldehydes both with respect to achieve sufficient performance levels to be economically viable in stabilizing and reducing asphaltene deposition in certain fluids and to obtain concentrated reaction products that have desired polymer molecular weights and do not have manufacturing handling issues due to high viscosities.

The inventors hereof have found that when two or more phenols which are either unsubstituted or substituted with certain alkyl branches and within a certain molar ratio range are used, the phenol aldehydes derived from ("mixed phenol aldehyde") can achieve higher performance levels as asphaltene stabilizers and deposition inhibitors and improved handling characteristics with moderate viscosity while meeting molecular weight targets as compared to phenol aldehydes formed from one long chain alkyl phenol. In addition, the mixed phenol aldehydes can be conveniently manufactured in a commercial setting.

The mixed phenol aldehydes provide improved asphaltene stabilization as compared to the phenol aldehydes formed from only one phenol at room temperature and/or elevated temperatures. The mixed phenol aldehydes also have improved asphaltene stabilization when used together with synergists such as amines and polyamines as compared to the blends of the same synergetic additive with phenol aldehydes formed from a single phenol.

As used herein, "mixed phenol aldehydes" refer to polymers derived from an aldehyde and two or more substituted-monophenol or unsubstituted-monophenol comprising a first phenol which is a $C_{1-20}$ linear or branched alkyl monophenol; and a second phenol which is unsubstituted or a $C_{1-20}$ linear or branched alkyl monophenol different from the first phenol. The substituents can be attached to the para, ortho, or both positions of the monophenol. Preferably the substituents are attached to the para position of the monophenol.

As used herein, a branched alkyl group refers to an alkyl group having an alkyl substituent. Exemplary phenols having branched alkyl groups include branched dodecyl phenol, branched nonyl phenol, tert-butyl phenol, t-amyl phenol, and branched hexyl phenols such as 4-(1-methylpentyl) phenol, 4-(1-ethyl, 2-methylpropyl) phenol, 4-(1,3-dimethylbutyl) phenol, 4-(1-ethyl, 1-methylpropyl) phenol, 4-(1,2-dimethylbutyl) phenol and 4-(1-ethylbutyl) phenol. A phenol having a branched alkyl group can refer to any of its branched isomers thereof or combinations thereof. For example, a branched alkyl phenol can refer to any of its isomers having a branched substituent or any combination of such isomers.

In an embodiment, the mixed phenol aldehydes are derived from a $C_{7-20}$ linear or branched alkyl monophenol and a $C_{1-6}$ linear or branched alkyl monophenol. In another embodiment, the mixed phenol aldehydes are derived from a $C_{9-12}$ linear or branched alkyl monophenol and a $C_{1-6}$ linear or branched alkyl monophenol.

In specific exemplary embodiments, the mixed phenol aldehydes are derived from the following combinations of the phenols: a branched 4-dodecyl phenol and para t-butyl phenol; a branched 4-nonyl phenol and para t-butyl phenol; a branched 4-dodecyl phenol and a branched 4-hexyl phenol; or a branched 4-nonyl phenol and a branched 4-hexyl phenol.

When the molar ratio of the two or more alkyl substituted monophenols is about 4:1 to about 1:4 (optionally in some embodiments about 2:1 to about 1:2), the mixed phenol aldehydes can have further improved performance in inhibiting the adverse effects of asphaltenes. For example, a mixed phenol aldehyde derived from a first phenol and second phenol having a molar ratio of about 4:1 to about 1:4 (optionally in some embodiments about 2:1 to about 1:2) can provide better asphaltene stabilization as compared to a reference phenol aldehyde derived from the first phenol alone, derived from the second phenol alone, or derived from both the first and second phenols but having a molar ratio falling outside of the range of about 4:1 to about 1:4 (optionally in some embodiments about 2:1 to about 1:2).

Exemplary aldehydes include formaldehyde, paraformaldehyde, acetaldehyde, propionaldehyde, butyraldehyde, glyoxal, glutaraldehyde, 1,9-nonanedial, or a combination comprising at least one of the foregoing. Formaldehyde is specifically mentioned.

In an embodiment, the mixed phenols formaldehydes resins have the formula

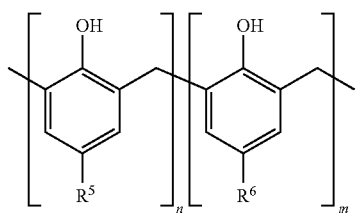

wherein $R^5$ is a $C_{7-20}$ linear or branched alkyl, $R^6$ is hydrogen or a linear or branched $C_{1-6}$ alkyl different from $R^5$, and n:m is about 4:1 to about 1:4. In an embodiment, $R^5$ is a $C_{9-12}$ linear or branched alkyl, and $R^6$ is a $C_{1-6}$ linear or branched alkyl. In specific exemplary embodiments, $R^5$ is dodecyl and $R^6$ is t-butyl; or $R^5$ is linear or branched dodecyl and $R^6$ is branched hexyl; or $R^5$ is nonyl and $R^6$ is t-butyl; or $R^5$ is dodecyl and $R^6$ is methyl. Optionally in some embodiments, n:m can be about 3:1 to about 1:3, about 2.8:1 to about 1:2.8, about 2.5:1 to about 1:2.5, about 2.3:1 to about 1:2.3, or about 2:1 to about 1:2.

Using two or more phenols as disclosed herein, the mixed phenol aldehydes derived therefrom can achieve longer chain lengths and higher weight average molecular weight than phenol aldehydes prepared by similar means using a single substituted alkyl monophenol. The weight average molecular weight of the mixed phenol aldehydes can be about 5,000 to about 20,000 Daltons or about 6,000 to about 10,000 Daltons, each measured by gel permeation chromatography (GPC), using a crosslinked styrene-divinylbenzene column.

Methods of making the mixed phenol aldehyde include reacting an aldehyde with two or more monophenols as disclosed herein in the presence of an acid catalyst such as a sulfonic acid (e.g. dodecylbenzene sulfonic acid), oxalic acid, or hydrochloric acid. An antifoaming agent can be added if desired. The molar ratio of the aldehyde relative to the sum of the moles of the two or more monophenols is about 0.4:1 to about 1.2:1. The reaction temperature can be about 90° C. to about 140° C. The reaction of the aldehyde with mixed phenols is generally conducted for about 30 minutes to about 4 hours, specifically less than about 3 hours.

The mixed phenol aldehydes as described herein are excellent asphaltene stabilizers. The amount of the mixed phenol aldehydes used to treat petroleum hydrocarbon fluids that contain asphaltenes can vary depending on the specific mixed phenol aldehydes used, the specific chemistry of the petroleum hydrocarbon fluids as well as the conditions such as the pressure and temperature that the petroleum hydrocarbon fluids are exposed to during production, refining, and storage. In an embodiment, about 5 ppm to about 5000 ppm, or about 10 ppm to about 1000 ppm, or about 25 ppm to about 500 ppm of the mixed phenol aldehydes are used to treat petroleum hydrocarbon fluids. The amounts disclosed herein are based on the volume of the phenol aldehydes themselves, not based on the volume of the phenol aldehyde solutions or dispersions that contain a solvent for the phenol aldehydes.

The mixed phenol aldehydes can be used alone or in combination with synergistic co-additives such as amines and polyamines for control of asphaltene precipitation. Exemplary synergistic additives include fatty acid based imidazoline, diethylenetriamine, tetraethylenetetramine, tetraethylenepentamine, or a combination comprising at least one of the foregoing.

When the molar ratio of the two or more unsubstituted or alkyl substituted monophenols is about 4:1 to about 1:4 (optionally about 2:1 to about 1:2 for some embodiments), the mixed phenol aldehydes together with the synergetic additives can have further improved asphaltene stabilization as compared to blends of the same synergetic additives and phenol aldehydes derived from a single phenol. For example, a blend of a synergistic additive and a mixed phenol aldehyde derived from a first phenol and second phenol having a molar ratio of about 4:1 to about 1:4 (optionally about 2:1 to about 1:2 for some embodiments) can provide better asphaltene stabilization as compared to a reference blend of the same synergistic additive with a phenol aldehyde derived from the first phenol alone, derived from the second phenol alone, or derived from both the first and second phenols but having a molar ratio falling outside of the range of about 4:1 to about 1:4 (optionally about 2:1 to about 1:2 for some embodiments).

The relative amounts of the synergistic additives and the mixed phenol aldehydes can be determined depending on the specific chemistry of the petroleum hydrocarbon fluids to be treated as well as the conditions such as the pressure and temperature the petroleum hydrocarbon fluids are exposed to during production, refining, and storage. In an embodiment, the synergistic additives are used at dosages of about 1 to about 25% of the amount of the mixed phenol aldehydes by weight. In another embodiment, the weight ratio of the mixed phenol aldehyde relative to the synergistic additive is about 99:1 to about 4:1.

It is appreciated that both the mixed phenol aldehydes and the synergistic additives can be added to the petroleum hydrocarbon fluids in the form of solutions or dispersions. The amounts disclosed herein are based on the weight of the synergistic additive and mixed phenol aldehyde themselves, not based on the weight of the synergistic additive/mixed phenol aldehyde solutions or dispersions in another solvent.

The mixed phenol aldehydes and the synergistic additives can be separately added to the petroleum hydrocarbon fluids to be treated. Alternatively or in addition, the mixed phenol aldehydes and the additives can be combined first to provide an asphaltene inhibitor composition, and the petroleum hydrocarbon fluids are contacted with the asphaltene inhibitor composition containing both the mixed phenol aldehyde and the synergetic additive.

In addition to the mixed phenolic aldehyde resins and the optional synergistic additives, the asphaltene inhibitor compositions can further include other components in the formulations. These components may be included to provide formulations with desirable physical properties or stability characteristics for process injection or storage considerations. Exemplary formulation components include solvents such as aromatic hydrocarbons, aliphatic hydrocarbons, alcohols, ethers, ketones, and aldehydes. The asphaltene inhibitor compositions can be formulated in various forms including, but are not limited to, solutions, dispersions, emulsions, and the like. Depending on the form of the asphaltene inhibitor compositions, additives such as water, surfactants, dispersants, emulsifiers, or a combination comprising at least one of the foregoing may be present.

Known additives can be added to enhance the performance of the asphaltene inhibitor compositions, such as in reducing asphaltene deposition and accumulation or for providing additional benefits to the products. Exemplary additives to provide additional benefits include dispersants, corrosion inhibitors, scale inhibitors, paraffin inhibitors, hydrate inhibitors, demulsifiers, sulfide scavengers, or a combination comprising at least one of the foregoing. Any known dispersants, corrosion inhibitors, scale inhibitors, paraffin inhibitors, hydrate inhibitors, demulsifiers, and sulfide scavengers can be used as long as the additives do not adversely affect the asphaltene inhibiting efficiency of the mixed phenolic aldehydes and the optional synergistic additives.

The mixed phenol aldehydes and the synergistic additives can be used to reduce or prevent asphaltene deposition and/or accumulation from petroleum hydrocarbon fluids. As used herein, petroleum hydrocarbon fluids include crude oil, natural gas condensate, shale oil, shale gas condensate, bitumen, diluted bitumen (dil-bit), refinery fractions, finished fuel, finished petroleum products, and combinations thereof. Petroleum hydrocarbon fluids can further contain water, brines, gases such as hydrocarbon gases, or a combination comprising at least one of the foregoing. A method of treating a petroleum hydrocarbon fluid comprises contacting the petroleum hydrocarbon fluid with the mixed phenol aldehydes and the synergistic co-additives as disclosed herein.

The contacting can be conducted at a temperature of about −50° C. to about 250° C., for example about −5° C. to about 200° C. or about 20° C. to about 150° C. and a pressure of about 14.7 pounds per square inch absolute (psia) to about 40,000 psia or about 14.7 psia to about 20,000 psia.

The contacting can be conducted during the production, storage, transportation, and/or refining of the petroleum hydrocarbon fluids. In an embodiment for the production of petroleum, the contacting is conducted in a reservoir. Any known methods of introducing the mixed phenol aldehydes and the synergistic additives into the reservoir can be used. For example, a squeeze process can be used to deliver the mixed phenol aldehydes and the synergistic additives to a reservoir. In another embodiment for the production of petroleum, the mixed phenol aldehydes and the synergistic additives can be applied in a continuous or batch injection process through a capillary line, down the backside of well annuluses, through an umbilical line, or through an umbilical/capillary line combination. When the contacting is conducted during storage, transportation and refinery, the mixed phenol aldehydes and the synergistic additives can be added to the petroleum hydrocarbon fluids in storage tanks, pipes, processing units, refinery streams and the like.

The petroleum hydrocarbon fluids with the mixed phenol aldehydes and the synergistic additives as disclosed herein can have reduced asphaltene deposition and/or accumulation, in terms of the amount, tendency, and/or the rate of deposition and/or accumulation. In an embodiment, provided are petroleum hydrocarbon fluids containing the mixed phenol aldehydes and the optional synergistic additives or derivatives thereof in amounts as disclosed herein.

The asphaltene inhibitors are further illustrated by the following non-limiting examples.

EXAMPLES

One method to evaluate asphaltene inhibitors is through measurement of asphaltene stability using the method described in U.S. Pat. No. 9,360,425 also referred to as the Analytical Centrifuge Stability Analysis for Asphaltenes (ACSAA). ACSAA couples use of an analytical centrifuge with a destabilization solvent addition process to a petroleum hydrocarbon fluid that allows a quantitative determination of the relative instability of asphaltenes in the particular hydrocarbon fluid. As such, the influence of asphaltene inhibitors at decreasing the relative instability of asphaltene in the hydrocarbon fluid can be measured with the ACSAA method and subsequently used to compare the relative performance of asphaltene inhibitors amongst each other.

The instability measurement calculated in the ACSAA method is termed the Instability Index. It is a normalized value of the instability of a sample ranging from 0 to 1. The value zero indicates no instability (no change or completely stable during the test) and the value 1 is the maximum change or instability.

Asphaltene inhibitors that provide the greatest decrease in instability index, over untreated or reference samples, are judged the better performing inhibitor chemistries or products. In the examples shown below, the percent improvement (or percent decrease) in instability index is given in tables and plotted for various crude oil treated with the mixed phenol aldehydes or blends of mixed phenol aldehydes with synergistic additives and, for comparison in the control examples, various crude oils treated with phenol aldehydes derived from a single phenol or mixed phenol aldehydes derived from two phenols having different molar ratios, either with or without current industry applied amines and polyamines.

ACSAA testing can be performed at various temperatures. In performing testing at higher temperatures, the petroleum hydrocarbon fluid, destabilizing solvent, and centrifuge tubes are all pre-heated before mixing the hydrocarbon fluid and destabilizing solvent. Afterwards these are mixed and then immediately placed and run in the analytical centrifuge maintained at test temperature. The analytical centrifuge used in the work below has a maximum operating temperature of 60° C. However, the effect of slightly higher temperatures can be obtained by heating samples (hydrocarbon fluid, destabilizing solvent, centrifuge tubes, etc.) at higher temperatures, mixing the hydrocarbon fluid and solvent, and then running in the centrifuge at 60° C. For example, some data below is reported as pseudo 80° C. In these experiments samples were heated to 90° C. in an oven, immediately mixed after removing from the oven and then run in the analytical centrifuge at 60° C.

General Procedure of Preparing Mixed Phenol Aldehydes with 2:1 Mole Ratio of Docecyl:Butyl Phenol Xylenes (50 g), ACP-1400 antifoam (0.3 g), and dodecylbenzene sulfonic acid (1.93 g) were added to a three-neck 500 mL round bottom flask containing t-butyl phenol (40.84 g) and dodecyl phenol (142.72 g). At 85° C., formaldehyde (30.03 g, 37% solution) was added via a fitted funnel over one hour with temperature not to exceed 95° C. The reaction mixture was stirred at 90° C. for one hour. The temperature of the reaction mixture was increased to 100° C. until a desired amount of water was collected via a Dean-stark trap. The temperature was increased slowly to 135° C. and was kept at 135° C. for 2 hours.

Examples 1-5

Different alkyl phenol aldehydes were prepared following the method described above. The weight average molecular weight was measured by gel permeation chromatography (GPC), using a crosslinked styrene-divinylbenzene column. The results are summarized in Table 1.

TABLE 1

| Phenol aldehyde | Phenol | Mw (Daltons) |
|---|---|---|
| CEx 1 | C12 alkyl (100%) | 4900 |
| CEx 2 | C9 alkyl (100%) | 3200 |
| Ex 3 | C12/C6 alkyl (2:1) | 9800 |
| Ex 4 | C12/C6 alkyl (1:1) | 7900 |
| Ex 5 | C12/C4 alkyl (2:1) | 6400 |

\* C12 alkyl: branched 4-dodecyl phenol
\*\* C9 alkyl: branched 4 nonyl phenol
\*\*\*C6 alkyl: equal amounts of 4-(1-methylpentyl) phenol, 4-(1-ethyl, 2-methylpropyl) phenol, 4-(1,3-dimethylbutyl) phenol, 4-(1-ethyl, 1-methylpropyl) phenol, 4-(1,2-dimethylbutyl) phenol and 4-(1-ethylbutyl) phenol
\*\*\*\*C4 alkyl: para tert-butyl phenol The results indicate that mixed phenols and formaldehyde provide higher molecular weight polymers with a Mn of 6,000 to 10,000 Daltons. On the other hand, when only one type of long chain phenol is used such as C12 alkyl or C9 alkyl phenols, the phenol aldehyde polymers have significantly lower weight average molecular weight with a Mn of 4900 and 3200 respectively. Moreover, even with the lower molecular weight, the polymers derived from 100% long chain phenols have higher viscosity and are more difficult to manufacture as compared to polymers made from mixed phenols and formaldehyde.

Examples 6-17

Examples 6-17 show the effect of alkyl phenol monomer ratio on the improvement in ACSAA instability index over untreated crude oil (blank) testing at 25° C. for Crude oil #1 treated with 200 and 400 ppm of a 40 wt. % solution of an alkyl phenol formaldehyde synthesized using different molar ratios of dodecyl phenol and t-butyl phenol. Formulations and results are summarized in Tables 2A and 2B. The results are also illustrated graphically in FIG. 1.

TABLE 2A

| | Unit | CEx 6 | CEx 7 | Ex 8 | Ex 9 | Ex 10 | CEx 11 |
|---|---|---|---|---|---|---|---|
| Component | | | | | | | |
| Phenol formaldehyde | ppm | 200 | 200 | 200 | 200 | 200 | 200 |
| Dodecyl/t-butyl phenol mole ratio | — | 1:0 | 2.5:1 | 2:1 | 1.5:1 | 1:2 | 0:1 |
| Performance | | | | | | | |
| Improvement over blank | % | 12.6 | 9.6 | 29.4 | 15.7 | 28.3 | −11.8 |

[1] The phenol formaldehydes used were 40 wt. % solutions.

TABLE 2B

| | Unit | CEx 12 | CEx 13 | Ex 14 | Ex 15 | Ex 16 | CEx 17 |
|---|---|---|---|---|---|---|---|
| Component | | | | | | | |
| Phenol formaldehyde | ppm | 400 | 400 | 400 | 400 | 400 | 400 |
| Dodecyl/t-butyl phenol mole ratio | — | 1:0 | 2.5:1 | 2:1 | 1.5:1 | 1:2 | 0:1 |
| Performance | | | | | | | |
| Improvement over blank | % | 20.9 | 19.5 | 44.8 | 24.7 | 45.1 | 0.5 |

[1] The phenol formaldehydes used were 40 wt. % solutions.

As seen from Table 2A and FIG. 1, without using any t-butyl phenol, the phenol formaldehyde derived from 100% dodecyl phenol has an improvement over blank of 12.6% when used at 200 ppm level (CEx 6). Without using any dodecyl phenol, the phenol formaldehyde derived from 100% t-butyl phenol performs even worse than the blank, which is not treated with any asphaltene inhibitor, with an adverse effect of 11.8% when used at 200 ppm level (CEx 11).

Surprisingly, when a combination of dodecyl phenol and t-butyl phenol is used at a molar ratio of 2:1, 1.5:1, and 1:2, the phenol formaldehydes derived therefrom have improvements over the blank of 29.4%, 15.7%, and 28.3% respectively at 200 ppm dosage level, which represents further improvement over the phenol formaldehyde derived from 100% dodecyl phenol (12.6%) and the phenol formaldehyde derived from 100% t-butyl phenol (−11.8%) when used at the same dosage level.

The results also indicate that not all the combinations of dodecyl phenol and t-butyl phenol can provide the synergistic effects. When a combination of dodecyl phenol and t-butyl phenol is used at a molar ratio of 2.5:1, the phenol formaldehydes derived therefrom have improvements over the blank of 9.6% at 200 ppm dosage level, which is not better than the phenol formaldehyde derived from 100% dodecyl phenol (12.6%) when used at the same dosage level.

Similar trends have been shown when the phenol formaldehydes are used at 400 ppm dosage level. (See Table 2B and FIG. 1)

Examples 18-23

The phenol formaldehydes of Examples 6-11 are further blended with 200 ppm of a polyamine. Examples 18-23 show the effect of the alkyl phenol monomer ratio on the improvement in instability index for the phenol formaldehyde/polyamine blend over untreated crude oil in ACSAA testing at 25° C. for the same Crude oil #1. Formulations and results are summarized in Table 3. The results are also illustrated graphically in FIG. 2.

TABLE 3

| | Unit | CEx 18 | CEx 19 | Ex 20 | Ex 21 | Ex 22 | CEx 23 |
|---|---|---|---|---|---|---|---|
| Component | | | | | | | |
| Phenol formaldehyde | ppm | 200 | 200 | 200 | 200 | 200 | 200 |
| Dodecyl/t-butyl phenol mole ratio | — | 1:0 | 2.5:1 | 2:1 | 1.5:1 | 1:2 | 0:1 |
| Polyamine | ppm | 200 | 200 | 200 | 200 | 200 | 200 |
| Performance | | | | | | | |
| Improvement over blank | % | 34.1 | 28.3 | 54.1 | 36.8 | 46.4 | −3.6 |

[1] The phenol formaldehydes used were 40 wt. % solutions.
[2] The polyamine used was 5 wt. % solution.

The results indicate that blending the polyamine with mixed phenol formaldehyde further improves the asphaltene stability of mixed phenol formaldehyde. The results also show that a blend of a phenol formaldehyde derived from a combination of dodecyl phenol and t-butyl phenol having certain molar ratios and the polyamine provides further improved asphaltene stability as compared to a blend of the same polyamine with a phenol formaldehyde derived from 100% dodecyl phenol or a blend of the same polyamine with a phenol formaldehyde derived from 100% of t-butyl phenol.

Figure 2:
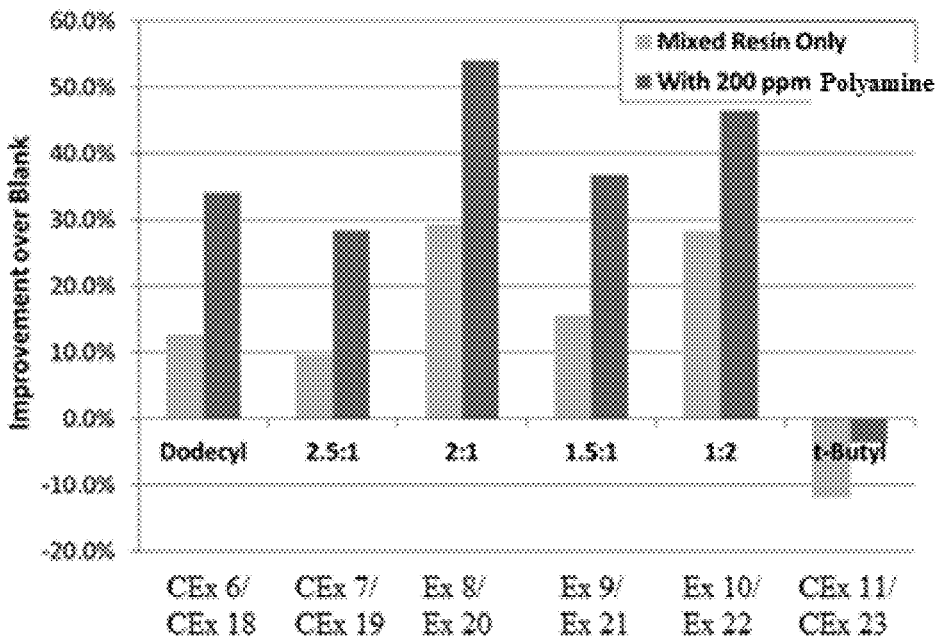
FIG. 2 shows the ACSAA test results at 25° C. on Crude Oil #1 treated with a blend of a polyamine with phenol aldehydes derived from 100% dodecyl phenol, or 100% of t-butyl phenol, or a combination of dodecyl/t-butyl phenol having different molar ratios.

In particular, as seen from Table 3 and FIG. 2, the phenol formaldehyde derived from 100% dodecyl phenol when blended with the polyamine has an improvement over blank of 34.1% (CEx 18). The phenol formaldehyde derived from 100% t-butyl phenol when blended with the polyamine performs even worse than the blank, which is not treated with any asphaltene inhibitor, with an adverse effect of −3.6% (CEx 23).

Surprisingly, when phenol formaldehydes derived from a combination of dodecyl phenol and t-butyl phenol at a molar ratio of 2:1, 1.5:1, and 1:2, are combined with the same polyamine, the asphaltene stability is improved to 54.1%, 36.8%, and 46.4% respectively, which represents further improvement over the blend of the polyamine and phenol formaldehyde derived from 100% dodecyl phenol (34.1%) and the blend of the polyamine and phenol formaldehyde derived from 100% t-butyl phenol (−3.6%) when tested at the same dosage level.

The results also indicate that not all the combinations of dodecyl phenol and t-butyl phenol can provide the synergistic effects. When a phenol formaldehyde derived from a combination of dodecyl phenol and t-butyl phenol with a molar ratio of 2.5:1 is blended with an the polyamine, the blend has improvements over the blank of 28.3%, which is not better than the performance of the blend of the polyamine and a phenol formaldehyde derived from 100% dodecyl phenol (34.1%).

Examples 24-29

Examples 24-29 show the effect of alkyl phenol monomer ratio on the improvement in instability index over untreated crude oil (blank) testing at 25° C. for Crude oil #2 treated with 500 ppm of a 40 wt. % solution of an alkyl phenol formaldehyde synthesized using different ratios of dodecyl phenol and t-butyl phenol. Formulations and results are summarized in Table 4. The results are also illustrated graphically in FIG. 3.

TABLE 4

| | Unit | CEx 24 | CEx 25 | Ex 26 | Ex 27 | Ex 28 | CEx 29 |
|---|---|---|---|---|---|---|---|
| Component | | | | | | | |
| Phenol formaldehyde | ppm | 500 | 500 | 500 | 500 | 500 | 500 |
| Dodecyl/t-butyl phenol mole ratio | — | 1:0 | 2.5:1 | 2:1 | 1.5:1 | 1:2 | 0:1 |
| Performance | | | | | | | |
| Improvement over blank | % | 35.7 | 28.3 | 37.8 | 25.8 | 41.8 | 12.6 |

[1] The phenol formaldehydes used were 40 wt. % solutions.

Figure 3:
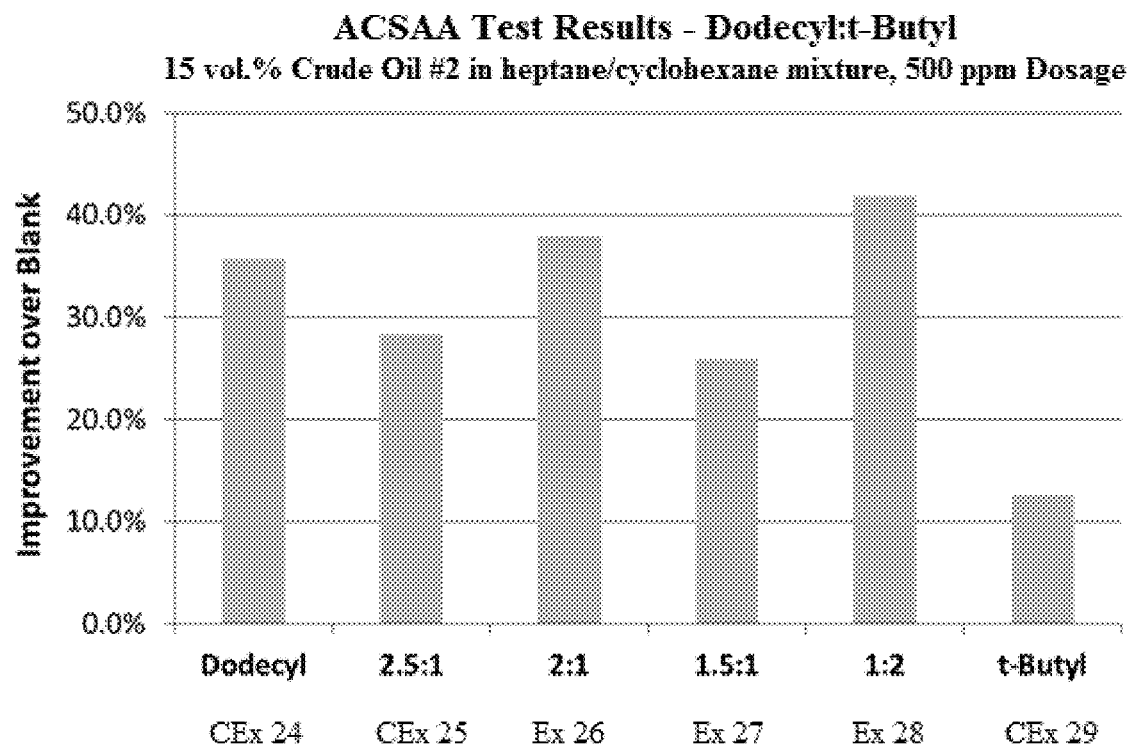
FIG. 3 shows the ACSAA test results at 25° C. on Crude Oil #2 treated with phenol aldehydes derived from 100% dodecyl phenol, or 100% t-butyl phenol, or a combination of dodecyl/t-butyl phenol having different molar ratios.

As seen from Table 4 and FIG. 3, when a combination of dodecyl phenol and t-butyl phenol is used at a molar ratio of 2:1 and 1:2, the phenol formaldehydes at 500 ppm loading level have improvements over the blank of 37.8% and 41.8% respectively, which represent further improvement over formaldehyde derived from 100% dodecyl phenol (35.7%) and formaldehyde derived from 100% t-butyl phenol (12.6%) when used at the same loading level. When a combination of dodecyl phenol and t-butyl phenol is used at a molar ratio of 2.5:1 and 1.5:1, the phenol formaldehydes at 500 ppm loading level have improvements over the blank of 28.3% and 25.8%, which is comparable or worse than the phenol formaldehyde derived from 100% dodecyl phenol (35.7%) when used at the same loading level.

Examples 30-35

Figure 4:
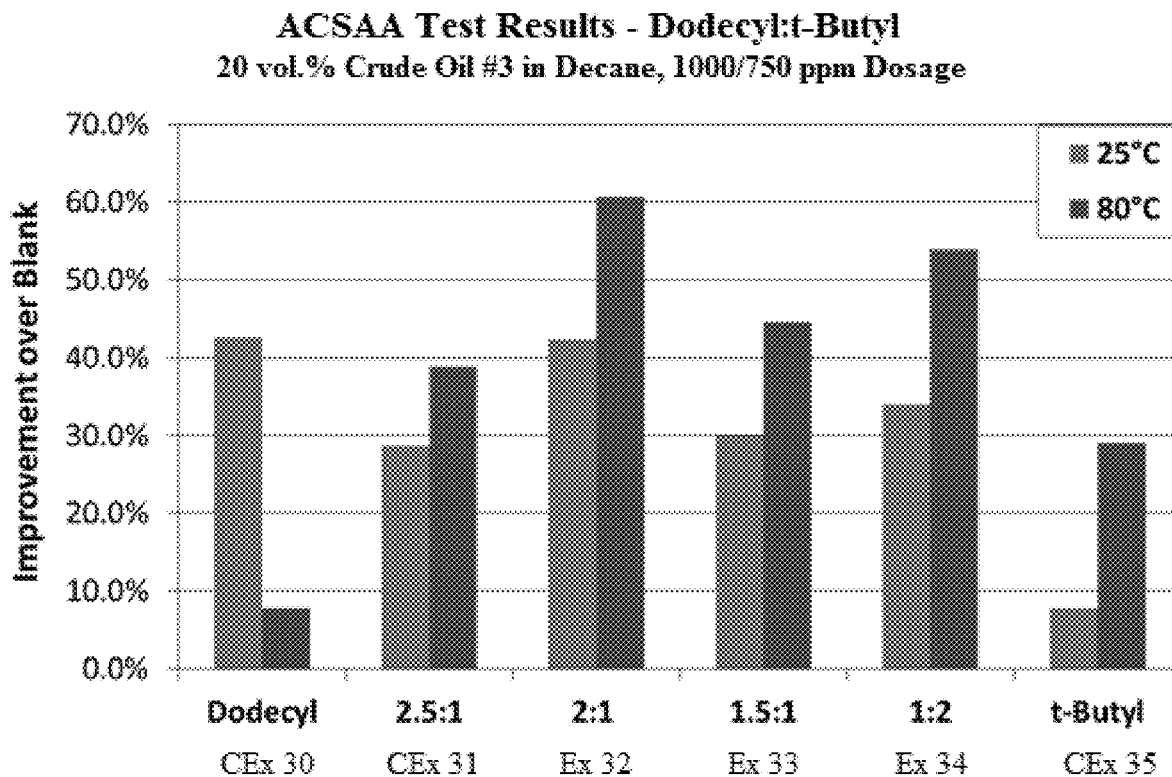
FIG. 4 shows the ACSAA test results at 25° C. and pseudo 80° C. on Crude Oil #3 treated with a blend of an amine with phenol aldehydes derived from 100% dodecyl phenol or a combination of dodecyl/t-butyl phenol.

Examples 30-35 show the effect of the alkyl phenol monomer ratio on the improvement in instability index over untreated crude oil in ACSAA testing at 25 and pseudo 80° C. for Crude oil #3 treated with 1000 ppm of a 40 wt. % solution of the alkyl phenol formaldehyde resin and 750 ppm of a 10 wt. % solution of an amine synergist. Formulations and results are summarized in Table 5. The results are also illustrated graphically in FIG. 4.

TABLE 5

| | Unit | CEx 30 | CEx 31 | Ex 32 | Ex 33 | Ex 34 | CEx 35 |
|---|---|---|---|---|---|---|---|
| Component | | | | | | | |
| Phenol formaldehyde | ppm | 1000 | 1000 | 1000 | 1000 | 1000 | 1000 |
| Dodecyl/t-butyl phenol mole ratio | — | 1:0 | 2.5:1 | 2:1 | 1.5:1 | 1:2 | 0:1 |
| amine | ppm | 750 | 750 | 750 | 750 | 750 | 750 |
| Performance | | | | | | | |
| Improvement over blank (25° C.) | % | 42.6 | 28.8 | 42.2 | 30.0 | 33.9 | 7.8 |

TABLE 5-continued

| | Unit | CEx 30 | CEx 31 | Ex 32 | Ex 33 | Ex 34 | CEx 35 |
|---|---|---|---|---|---|---|---|
| Improvement over blank (80° C.) | % | 7.88 | 38.9 | 60.6 | 44.6 | 53.9 | 29.0 |

[1.] The phenol formaldehyde resins used were 40 wt. % solutions.
[2.] The amine used was 5 wt. % solution.

The results show that in testing at 25° C., the mixed resins do not have better results in improvement over untreated crude oil compared to the pure 100% dodecyl phenol formaldehyde resin. However as the temperature is increased significantly better improvement over blank untreated crude oil is provided in the ACSAA testing by the mixed resins compared to the pure 100% dodecyl phenol formaldehyde resin as well as the 100% t-butyl phenol formaldehyde resin.

Examples 36-38

Figure 5:
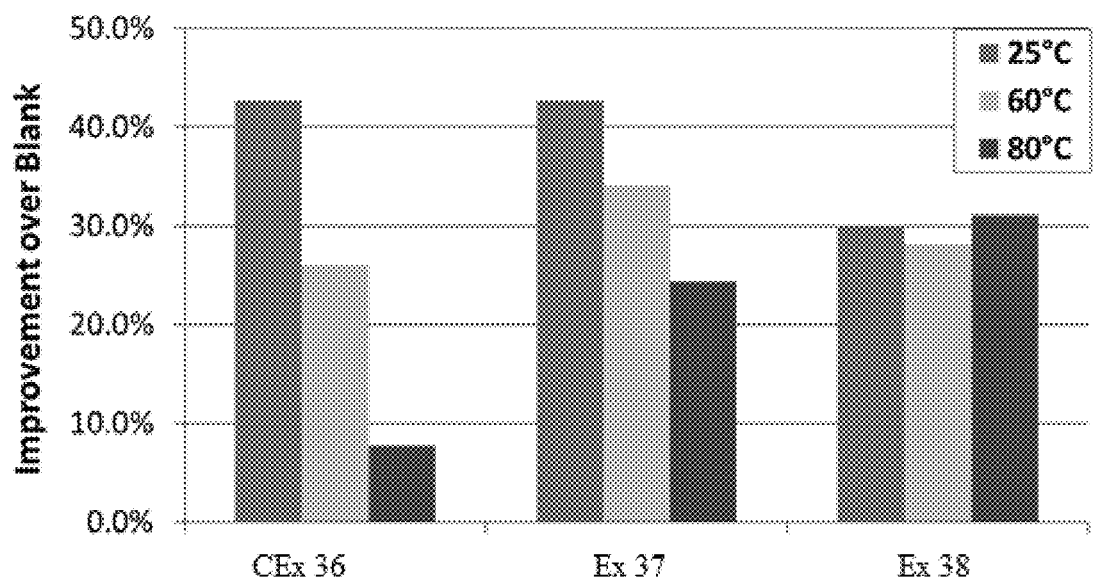
FIG. 5 shows the ACSAA test results at 25, 60, and pseudo 80° C. on Crude Oil #3 treated with a blend of an amine with phenol aldehydes derived from 100% dodecyl phenol or a combination of dodecyl/t-butyl phenol.

Examples 36-38 show a comparison of two mixed dodecyl/t-butyl alkyl phenol monomer ratios on the improvement in instability index over crude oil treated with a 100% dodecyl phenol formaldehyde resin in ACSAA testing at 25, 60, and pseudo 80° C. for Crude oil #3 treated with 1000 ppm of a 40 wt. % solution of the alkyl phenol formaldehyde resin and 750 ppm of a 10 wt. % solution of an amine synergist. Formulations and results are summarized in Table 6. The results are also illustrated graphically in FIG. 5.

TABLE 6

| Component | Unit | CEx 36 | Ex 37 | Ex 38 |
|---|---|---|---|---|
| Phenol formaldehyde | ppm | 1000 | 1000 | 1000 |
| Dodecyl/t-butyl phenol mole ratio | — | 1:0 | 2:1 | 1:2 |
| Amine | ppm | 750 | 750 | 750 |
| Performance | | | | |
| Improvement over blank (25° C.) | % | 42.6 | 42.6 | 30.0 |
| Improvement over blank (60° C.) | % | 26.1 | 34.0 | 28.2 |
| Improvement over blank (80° C.) | % | 7.8 | 24.4 | 31.1 |

[1.] The phenol formaldehyde resins used were 40 wt. % solutions.
[2.] The amine used was 10 wt. % solution.

The results indicate that in testing at 25° C., the mixed resins do not have better result in improvement over untreated crude oil compared to the pure 100% dodecyl phenol formaldehyde resin. However as the temperature is increased significantly better improvement over blank untreated crude oil is provided in the ACSAA testing by the mixed resins compared to the pure 100% dodecyl phenol formaldehyde resin.

Set forth are various embodiments of the disclosure.

Embodiment 1

A method of stabilizing asphaltenes in a petroleum hydrocarbon fluid, the method comprising: contacting the petroleum hydrocarbon fluid with a mixed phenol aldehyde derived from an aldehyde and two or more unsubstituted or alkyl-substituted monophenols, the two or more unsubstituted or alkyl-substituted monophenols comprising a first phenol which is a $C_{1-20}$ linear or branched alkyl monophenol; and a second phenol which is unsubstituted or a $C_{1-20}$ linear or branched alkyl monophenol different from the first phenol, wherein the molar ratio of the first phenol relative to the second phenol is about 4:1 to about 1:4.

Embodiment 2

The method of Embodiment 1, wherein the mixed phenol aldehyde has a higher weight average molecular weight, a lower viscosity, or a combination thereof than a reference phenol aldehyde prepared by the same method using a single alkyl-substituted monophenol and the same aldehyde, determined under the same testing conditions.

Embodiment 3

The method of Embodiment 1 or Embodiment 2, wherein the aldehyde comprises formaldehyde, paraformaldehyde, acetaldehyde, propionaldehyde, butyraldehyde, glyoxal, glutaraldehyde, 1,9-nonanedial, or a combination comprising at least one of the foregoing.

Embodiment 4

The method of any one of Embodiments 1 to 3, wherein the mixed phenol aldehyde has a structure represented by the formula

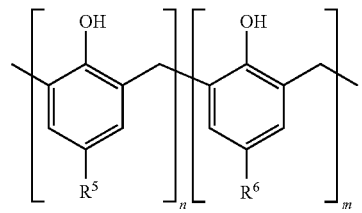

wherein $R^5$ is a $C_{7-20}$ linear or branched alkyl, $R^6$ is a hydrogen or a linear or branched $C_{1-6}$ alkyl different from $R^5$, and n:m is about 4:1 to about 1:4.

Embodiment 5

The method of Embodiment 4, wherein $R^5$ is a $C_{9-12}$ linear or branched alkyl, and $R^6$ is a $C_{1-6}$ linear or branched alkyl.

Embodiment 6

The method of Embodiment 4 or Embodiment 5, wherein $R^5$ is a linear or branched dodecyl and $R^6$ is t-butyl.

Embodiment 7

The method of any one of Embodiments 1 to 6, wherein the amount of the mixed phenol aldehyde is about 50 ppm to about 5000 ppm based on a total volume of the petroleum hydrocarbon fluid.

Embodiment 8

The method of any one of Embodiments 1 to 7, wherein a synergistic additive is used together with the mixed phenol aldehyde to treat the petroleum hydrocarbon fluid, and the synergistic additive comprises an amine, a polyamine, or a combination thereof.

Embodiment 9

The method of Embodiment 8, wherein the synergistic additive comprises a fatty acid based imidazoline, diethylenetriamine, tetraethylenetetramine, tetraethylenepentamine, or a combination comprising at least one of the foregoing.

Embodiment 10

The method of Embodiment 8 or Embodiment 9, wherein the weight ratio of the mixed phenol aldehyde relative to the synergistic additive is about 99:1 to about 4:1.

Embodiment 11

The method of any one of Embodiments 1 to 10, wherein the petroleum hydrocarbon fluid further contains water, brine, a gas, or a combination comprising at least one of the foregoing.

Embodiment 12

The method of any one of Embodiments 1 to 11, wherein the contacting is conducted during production, storage, transportation, and refining of the petroleum hydrocarbon fluid.

Embodiment 13

The method of any one of Embodiments 1 to 12, wherein the contacting is conducted at a temperature of about −50° C. to about 250° C. and a pressure of about 14.7 psig to about 40,000 psig.

Embodiment 14

The method of any one of Embodiments 8 to 13, wherein the mixed phenol aldehyde and the synergist additive are separately added to the petroleum hydrocarbon fluid.

Embodiment 15

The method of any one of Embodiments 1 to 14, further comprising combining the mixed phenol aldehyde and the synergist additive to provide an asphaltene inhibitor composition, and contacting the petroleum hydrocarbon fluid with the asphaltene inhibitor composition.

Embodiment 16

A petroleum hydrocarbon fluid comprising an asphaltene inhibitor or dispersion composition that contains a mixed phenol aldehyde derived from an aldehyde and two or more unsubstituted or alkyl-substituted monophenols, the two or more unsubstituted or alkyl-substituted monophenols comprising a first phenol which is a $C_{1-20}$ linear or branched alkyl monophenol; and a second phenol which is unsubstituted or a $C_{1-20}$ linear or branched alkyl monophenol different from the first phenol, wherein the molar ratio of the first phenol relative to the second phenol is about 4:1 to about 1:4.

Embodiment 17

The petroleum hydrocarbon fluid of Embodiment 16, further comprising a synergistic additive, and the synergistic additive comprises an amine, a polyamine, or a combination thereof.

Embodiment 18

An asphaltene inhibitor composition comprising a mixed phenol aldehyde derived from an aldehyde and two or more unsubstituted or alkyl-substituted monophenols, the two or more unsubstituted or alkyl-substituted monophenols comprising a first phenol which is a $C_{1-20}$ linear or branched alkyl monophenol; and a second phenol which is unsubstituted or a $C_{1-20}$ linear or branched alkyl monophenol different from the first phenol, wherein the molar ratio of the first phenol relative to the second phenol is about 4:1 to about 1:4.

Embodiment 19

The asphaltene inhibitor composition of Embodiment 18, wherein the mixed phenol aldehyde has a structure represented by the formula

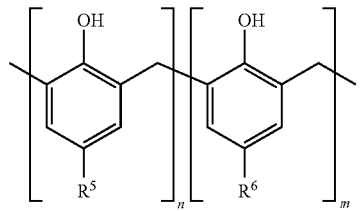

wherein $R^5$ is a $C_{7-20}$ linear or branched alkyl, $R^6$ is a hydrogen or a linear or branched $C_{1-6}$ alkyl different from $R^5$, and n:m is about 4:1 to about 1:4.

Embodiment 20

The asphaltene inhibitor composition of Embodiment 18 or Embodiment 19, wherein $R^5$ is a $C_{9-12}$ linear or branched alkyl, and $R^6$ is a $C_{1-6}$ linear or branched alkyl.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:
1. A method of stabilizing asphaltenes in a petroleum hydrocarbon fluid, the method comprising:
contacting the petroleum hydrocarbon fluid with a mixed phenol aldehyde, the mixed phenol aldehyde having a structure represented by the formula

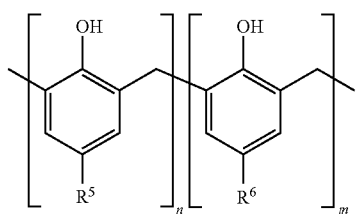

wherein
$R^5$ is a linear or branched dodecyl,
$R^6$ is t-butyl, and
n:m is 2.3:1 to 1:2.3.

2. The method of claim 1, wherein the mixed phenol aldehyde has a higher weight average molecular weight, a lower viscosity, or a combination thereof than a reference phenol aldehyde prepared by the same method using a single alkyl-substituted monophenol and the same aldehyde, determined under the same testing conditions.

3. The method of claim 1, wherein the amount of the mixed phenol aldehyde is about 50 ppm to about 5000 ppm based on a total volume of the petroleum hydrocarbon fluid.

4. The method of claim 1, wherein a synergistic additive is used together with the mixed phenol aldehyde to treat the petroleum hydrocarbon fluid, and the synergistic additive comprises an amine, a polyamine, or a combination thereof.

5. The method of claim 4, wherein the synergistic additive comprises a fatty acid based imidazoline, diethylenetriamine, tetraethylenetetramine, tetraethylenepentamine, or a combination comprising at least one of the foregoing.

6. The method of claim 4, wherein the weight ratio of the mixed phenol aldehyde relative to the synergistic additive is about 99:1 to about 4:1.

7. The method of claim 1, wherein the petroleum hydrocarbon fluid further contains water, brine, a gas, or a combination comprising at least one of the foregoing.

8. The method of claim 1, wherein the contacting is conducted during production, storage, transportation, and refining of the petroleum hydrocarbon fluid.

9. The method of claim 1, wherein the contacting is conducted at a temperature of about −50° C. to about 250° C. and a pressure of about 14.7 psig to about 40,000 psig.

10. The method of claim 1, wherein the mixed phenol aldehyde and the synergist additive are separately added to the petroleum hydrocarbon fluid.

11. The method of claim 1, further comprising combining the mixed phenol aldehyde and the synergist additive to provide an asphaltene inhibitor composition, and contacting the petroleum hydrocarbon fluid with the asphaltene inhibitor composition.

12. A petroleum hydrocarbon fluid comprising:
an asphaltene inhibitor or dispersion composition that contains a mixed phenol aldehyde, the mixed phenol aldehyde having a structure represented by the formula

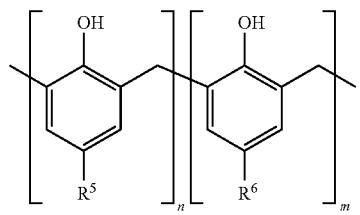

wherein
$R^5$ is a linear or branched dodecyl,
$R^6$ is t-butyl, and
n:m is 2.3:1 to 1:2.3.

13. The petroleum hydrocarbon fluid of claim 12, further comprising a synergistic additive, and the synergistic additive comprises an amine, a polyamine, or a combination thereof.

14. An asphaltene inhibitor composition comprising:
a mixed phenol aldehyde having a structure represented by the formula

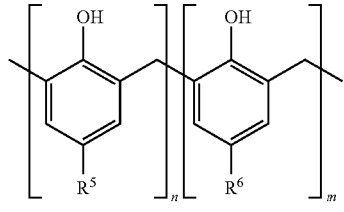

wherein
$R^5$ is a linear or branched dodecyl,
$R^6$ is t-butyl, and
n:m is 2.3:1 to 1:2.3.

* * * * *